J. W. GRISWOLD AND H. O. LOEBELL.
METALLURGICAL FURNACE.
APPLICATION FILED JULY 24, 1918.
1,375,754.
Patented Apr. 26, 1921.
3 SHEETS—SHEET 1.
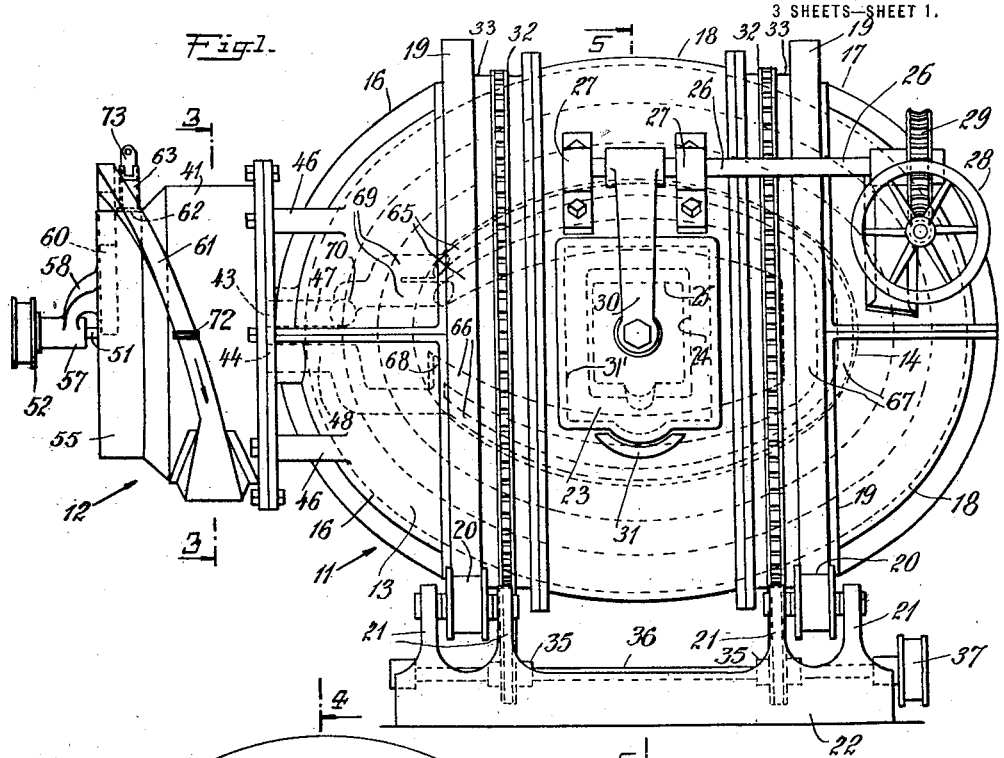
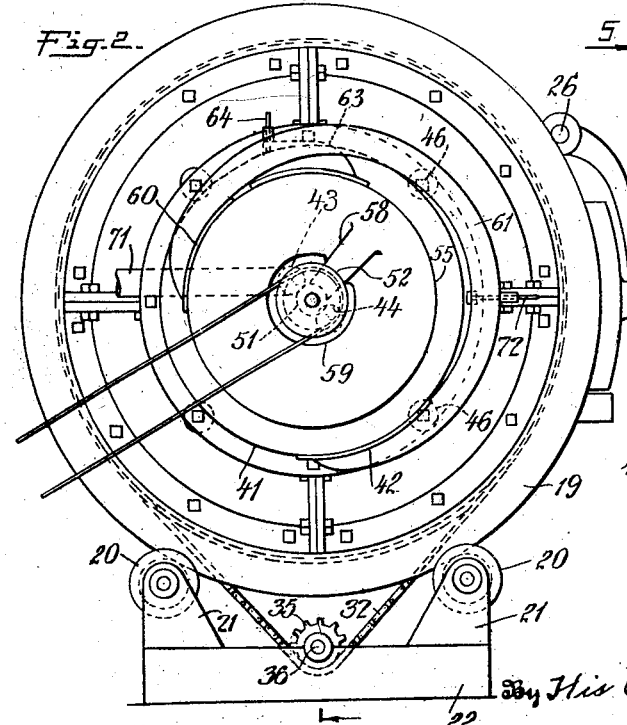
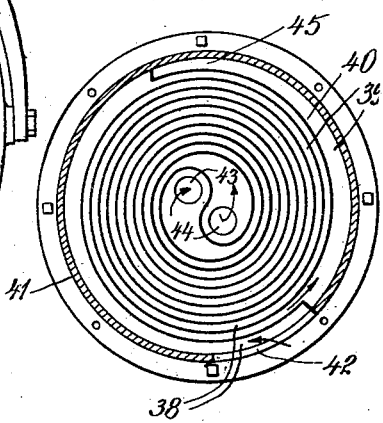
Inventors
John W. Griswold
Henry O. Loebell
By His Attorney
Edmund G. Borden

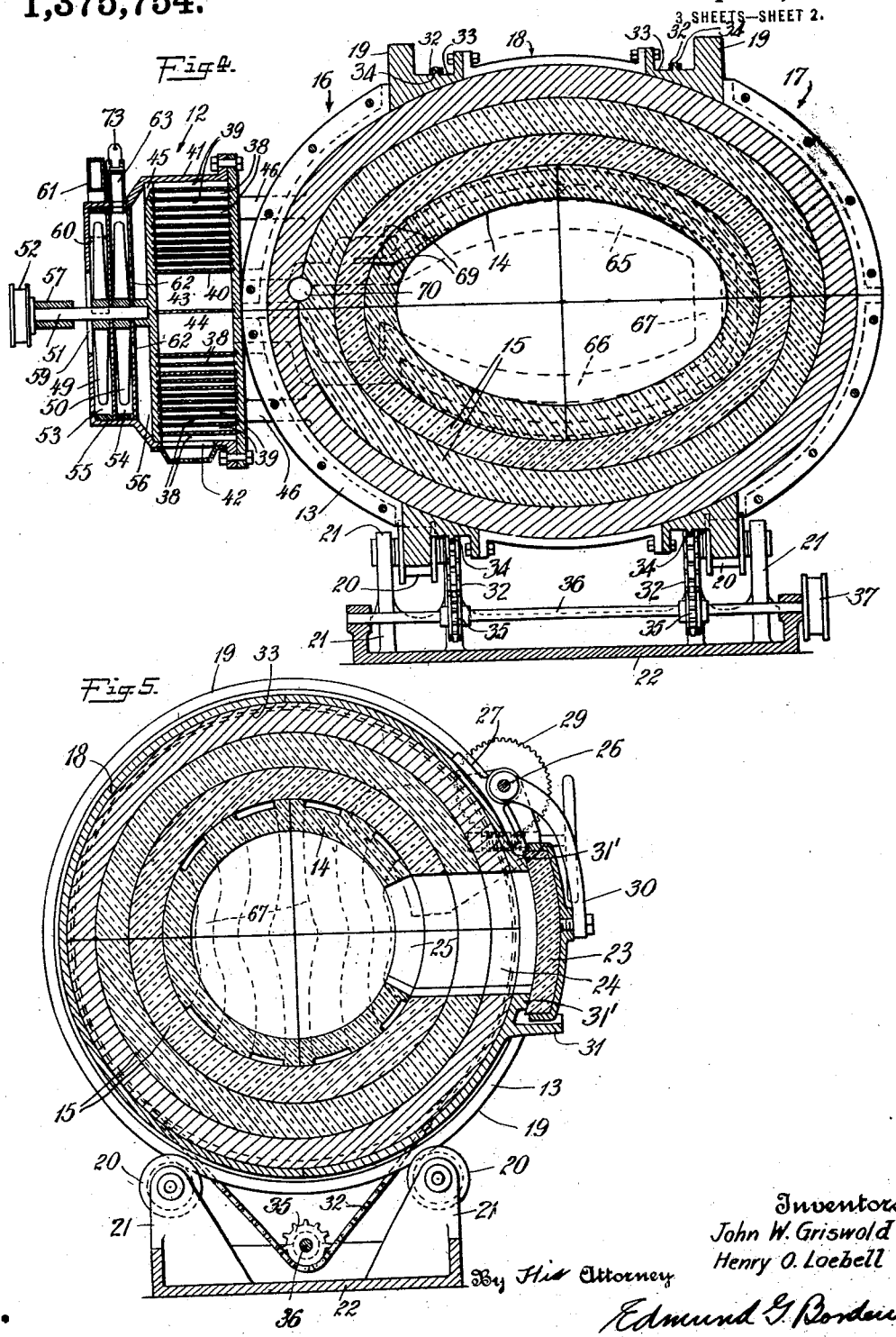

J. W. GRISWOLD AND H. O. LOEBELL.
METALLURGICAL FURNACE.
APPLICATION FILED JULY 24, 1918.
1,375,754.
Patented Apr. 26, 1921.
3 SHEETS—SHEET 3.
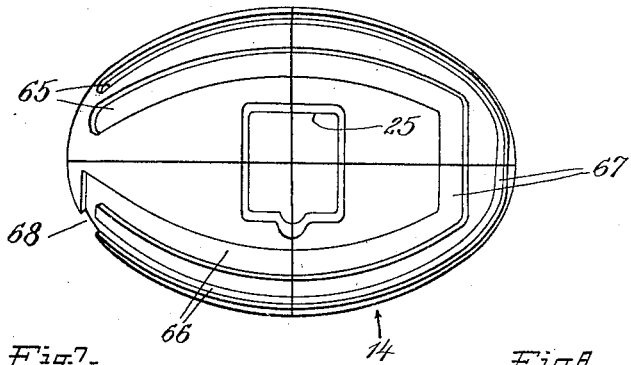
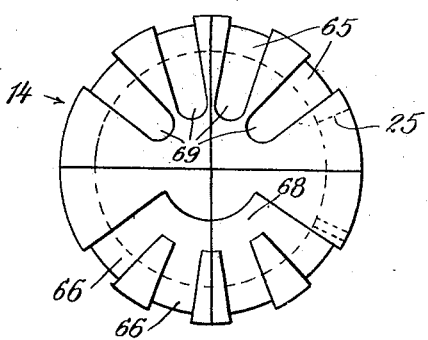
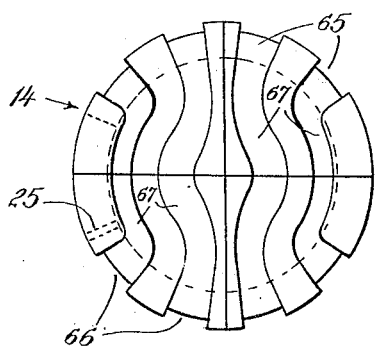
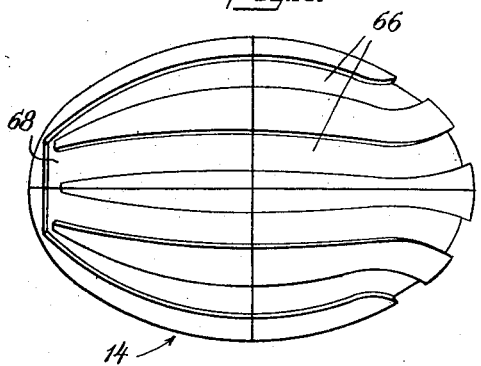
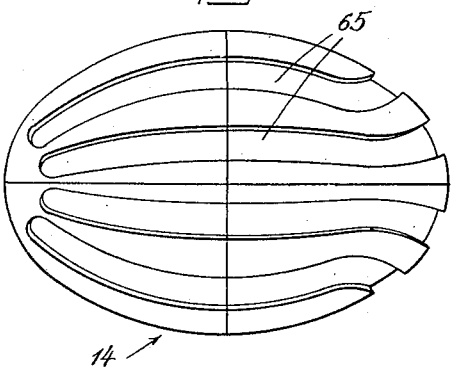
Inventors
John W. Griswold
Henry O. Loebell
By His Attorney
Edmund G. Borden

UNITED STATES PATENT OFFICE.

JOHN WILLIAM GRISWOLD AND HENRY O. LOEBELL, OF TOLEDO, OHIO.

METALLURGICAL FURNACE.

1,375,754.  Specification of Letters Patent.  Patented Apr. 26, 1921.

Application filed July 24, 1918. Serial No. 246,455.

*To all whom it may concern:*

Be it known that we, JOHN WILLIAM GRISWOLD, a citizen of the United States, and HENRY O. LOEBELL, a subject of the King of Roumania, both residing at Toledo, county of Lucas, and State of Ohio, have invented certain new and useful Improvements in Metallurgical Furnaces; and we do hereby declare the following to be a full, clear, and exact description of the invention, such as will enable others skilled in the art to which it appertains to make and use the same.

This invention relates to metallurgical furnaces and more particularly to metallurgical furnaces which are heated by a gaseous or vaporous fuel.

The metallurgical furnaces in common use for melting brass or alloys containing volatile metals are very inefficient in that they do not conserve heat and since they cause a very high loss of metal due to volatilization. The alloys are usually melted in crucibles which have a very heavy structure to permit them to be handled for pouring the molten metal. The type of furnace construction which will permit the use of crucibles that are removable for pouring is necessarily one which will not conserve heat and only the best grades of fuels having high heat values can be used in such furnaces. These furnaces have not been heated by gas because a large amount of gas has to be burned in order to obtain the necessary temperatures and volume of heat, and since the efficiency of the burning operation is low, the expense is very high.

The primary object of the present invention is to provide a metallurgical furnace which may be efficiently heated by gas.

In accordance with this object, one feature of the invention contemplates the provision of a metallurgical furnace body rotatably mounted for pouring and having a melting chamber formed therein, of a series of combustion flues in said body surrounding said melting chamber, and means for burning gas with air in said flue.

If brass or a similar alloy is melted in an open crucible, the zinc or other volatile metals are continuously being driven off and lost by volatilization so that the chemical constitution of the alloy is always changing. Metallurgists have recommended that the volatilization of metals might be overcome by melting the metals in a closed crucible. Up to the present time, however, an apparatus for carrying out this recommendation has not proved effective for several reasons; first, the temperatures required for melting brass or similar alloys is so high that the crucible must be constructed of a refractory plastic material in order to withstand the heat; second, the common refractory plastics are porous and permit gases to pass through them quite readily, and the porosity of the refractories increases as they become heated; third, if an internal vapor pressure is developed in a refractory crucible, the combustion products passing rapidly around the outside of the crucible create a suction which will withdraw the volatile metal fumes through the furnace walls and cause an appreciable loss of metal.

Accordingly, another object of the invention is to provide a metallurgical furnace in which volatile metals may be effectively melted without a substantial loss of metal due to volatilization.

With this object in view, another feature of the invention contemplates the provision in a furnace body having a melting chamber formed therein comprising a refractory shell and a series of combustion flues surrounding the external surface of said shell, of means for closing the melting chamber pressure-tight during the heating operation to develop a vapor pressure in said chamber and prevent the volatilization of the metals.

To overcome the tendency of the volatile metals from passing through the walls of the melting chamber while the metal is being melted under pressure, the gases are burned in the combustion flues surrounding the melting chamber at a pressure which will balance the vapor pressure developed in the melting chamber. To maintain the pressure in the combustion flues, the melting chamber shell at the inner side of the flues is made of a refractory having a high resistance to the passage of gas therethrough and the gas-pervious refractory on the outside of the flues is inclosed in a gas-impervious metal casing. With this construction, the gas pressure in the combustion flues can be built up to equalize the vapor pressure in the melting chamber and at the same time the combustion of gas in the flues may be controlled by a balance draft mechanism.

Accordingly, another feature of the invention contemplates the provision in a furnace having a melting chamber comprising a shell formed of a refractory of low degree of perviousness to gas with combustion flues surrounding said shell, and a gas-impervious casing inclosing said flues, of means for controlling the pressure and combustion of gases in said flues.

Other features of the invention consist in certain devices, combinations, and arrangements of parts hereinafter described and claimed, the advantages of which will be obvious to those skilled in the art from the following description.

The various features of the invention are illustrated in the accompanying drawings, in which, Figure 1 is a side elevation, showing one form which the invention may take in practice;

Fig. 2 is an end view;

Fig. 3 is a transverse section through the recuperator, taken on line 3—3 of Fig. 1;

Fig. 4 is a longitudinal section taken on line 4—4 of Fig. 2;

Fig. 5 is a transverse section through the body of the furnace, taken on line 5—5 of Fig. 1;

Fig. 6 is a side elevation of the melting chamber;

Figs. 7 and 8 are left and right-hand end views, respectively, of Fig. 6; and

Figs. 9 and 10 are top and bottom plan views, respectively, of Fig. 6.

Referring more particularly to the drawings, there is shown a furnace which, as previously stated, is designed primarily for melting brass, but which may equally be used for treating other metals, particularly volatile metals; the said furnace comprising two main parts, viz., a body and a recuperator, indicated generally by the numerals 11 and 12, which are in flue or pipe communication with each other in the manner subsequently described. The first-mentioned part, i. e., the body 11, is here shown as elliptical in shape or substantially so, and as consisting of an outer metal shell or covering 13, an inner melting chamber 14, and an intermediate portion 15 composed of layers of refractory material of some character.

The aforesaid body is arranged with its major axis in a horizontal plane, and its shell 13 is, or may be, composed of suitably connected sections 16, 17 and 18, as shown in Fig. 4, of which the two end sections 16 and 17 are provided with continuous, transversely-arranged, circumferential tracks 19 engaged, each, by a pair of rollers 20 (Figs. 4 and 5), these rollers being mounted beneath the axis of the furnace in pairs of brackets 21, which are supported, in turn, on a base 22. The central section 18 is equipped with a charging door 23, which serves to open and close a passage 24 leading into an opening 25 in the side of the melting chamber 14. The mechanism for opening and closing the charging door may, as represented, advantageously comprise a horizontal rock shaft 26 mounted in bearings 27 carried by the central shell section 18 and rotated by a hand-wheel 28, provided on the right hand end section 17, through the intermediary of a worm gearing 29, said shaft 26 having secured to it a depending arm 30 which is connected at its lower end to the door, the lower edge of the latter coacting with a lip or guide 31. Rotation of the hand wheel in one direction or the other will, in consequence of this arrangement, rock the shaft 26 through the gearing 29, and hence will raise or lower the charging door, as will be understood. The charging door makes a tight fit with a flange 31' of the section 18 so that the door may be closed sufficiently tight by the worm gear to allow the volatile metals to build up a vapor pressure in the melting chamber. A comparatively low vapor pressure in the melting chamber will practically prevent volatilization of the metals.

To permit the molten metal to be discharged from the melting chamber, the furnace proper is arranged to be given a rotary movement to lower the discharge opening. This movement of the furnace may be effected by means of suitable mechanism, a sprocket chain being employed in the construction illustrated. To this end there is arranged adjacent each track 19 a sprocket chain 32 that encircles the furnace body and engages teeth 34 formed on an extension 33 of said track. The chains 32 pass around sprockets 35 fixed on a shaft 36 journaled in the base 22. A pulley 37 fixed on the shaft 36 is adapted for connection with a suitable source of power (not shown).

The melting chamber 14 of the furnace is directly and primarily associated with the recuperator 12, to the extent that the air supplied to the latter passes therefrom to the melting chamber, while the gas discharged from said chamber is drawn into the recuperator to heat the incoming air. For that reason, the melting chamber will be described in detail after the description of the recuperator has been completed. According to the preferred form of the invention, the recuperator 12 comprises separate inlet or air flues 38 and return or gas flues 39, the incoming air passing from the outside of the recuperator to the center thereof, through the flues 38, and the outgoing heated gas or products of combustion passing from the center of the recuperator to the outside through the return flues 39. These flues 38 and 39 are preferably of a spiral character, and may take the form of a double spiral or of any multiple of two spirals. With this construction, the flues for the burned gas and air are arranged alternately, but this arrangement is not essential, it being necessary only to keep the burned gas and the air in separate flues. Another feature of this type of recuperator resides in the fact that the air and combustion gas currents are separated by a comparatively thin diaphragm so that the transfer of heat is very rapid. The circulation of the air and burned gas in the recuperator is controlled by fans and the spiral flues provide a continuous smooth passage for the gases and have a minimum of friction, since there are no sharp bends or corners for the gas to move around. The air enters the outermost convolution on the air side through an opening 42 and leaves the recuperator through the enlarged open end 43 of the innermost convolution on the air side, while the burned gas enters the enlarged open end 44 of the innermost convolution on the return or gas side and leaves through an opening 45 in the outermost convolution on the gas side. The recuperator is attached bodily to the left-hand end section 16 of the furnace by means of a plurality of lateral fastening devices 46, and its flue openings 43 and 44 communicate directly with combustion flues surrounding the melting chamber through the air inlet and gas outlet passages 47 and 48, respectively.

The mechanism for forcing the air into the passage or flue 38, and for drawing out the gas from the passage or flue 39, is a draft regulating and balancing means and comprises a blast fan 49 and an exhaust fan 50, both mounted on a common shaft 51 provided with a pulley 52 or the like, whereby it may be rotated. These fans are located in casings 53 and 54 disposed side by side and arranged within an extension 55 on the left-hand side of the recuperator, that is, to the left of the drum 41, there being a space or chamber 56 between the exhaust fan casing 54 and the said drum 41, as clearly illustrated in Fig. 4. The fan shaft 51 is mounted in a bearing 57 suspended by an arm 58 from the blast fan casing 53, the front wall of which latter is formed with an opening 59 through which the air is drawn into said casing by the action of the fan. This casing 53 has an opening 60 which registers with one end of a spiral duct 61, located exteriorly of and partly encircling the recuperator, the other end of the duct registering with the inlet opening 42 above referred to, so that the air drawn into said casing is forced therefrom by the fan 49 into and through the duct 61 and thence into the outermost convolution 38 on the air side of the drum, after which it passes through the successive convolutions 38 to the center of the drum, leaving the latter through the opening 43 and passing through the conduit or passage 47 into the melting chamber. The outlet end of the duct 61 is appreciably enlarged at its connection with the flue 38.

The exhaust gas is drawn from the melting chamber by the action of the fan 50; passes through the passage 48 into the innermost return flue 39 in the recuperator drum by way of the opening 44, and, after successively traversing the remaining flues 39 in an outward direction, is discharged from the drum through the opening 45. Thence it passes into the chamber 56 which it leaves through openings 62 (Fig. 4), and enters the exhaust fan casing 54, from which it is driven by the action of the fan 50 into and through an outlet duct 63.

During its progress through the flues 38 in the recuperator, the air is heated by reason of its proximity to the flues 39 through which the heated gas from the melting chamber is being drawn off. In consequence, the air reaches the inlet passage 47 leading to the melting chamber in a highly-heated state; and at this point, it meets the fuel gas, which enters the said passage through an opening 70 formed through the furnace adjacent one end thereof. The gas may be delivered to the opening 70 in any desired manner, for example, by a hose or other flexible pipe 71, which extends along the outside of the furnace and is connected to a suitable source of supply, the arrangement being such that the supply pipe 71 bends to permit the furnace to rotate. On meeting the ignited gas, the air is burned therein, and the mixture is caused to pass forward and backward over substantially the entire surface of the melting chamber.

According to the preferred embodiment of the invention, which is illustrated in Figs. 6 to 10, the elliptical shell of the chamber is formed with continuous channels or flues comprising oppositely-located inlet and outlet portions 65 and 66, extending longitudinally of the shell, and connecting portions 67 joining the right-hand ends of the said inlet and outlet portions. The inlet ends of the various outlet portions 66 open into an arcuate connecting channel 68 (best shown in Fig. 7), which registers, in turn, with the gas outlet passage 48. The ends of the inlet portions 65 register with the air inlet passage 47, which is formed with an extension or branch 69 for each of said inlet portions 65. Hence, the highly-heated gaseous mixture enters the inlet portions 65 of the channels from the main and branch passages 47 and 69, traverses said inlet portions and passes from them into and through the connecting portions 67, and then passes into and through the outlet portions 66 and the outlet passages 48, from which it enters the return or gas flues 39 of the recuperator, as previously explained. The flues 65, 66 and 67 have a predetermined cross-sectional area for controlling the combustion therein. With the ordinary types of industrial gases, the gas will be ignited before entering the inlet ends 69 and the area of the flues will be so proportioned that the gas will burn during its entire passage through the flues 65, 66 and 67. With this form of combustion, the greatest heat will be developed in the flue 66 or directly in contact with the portion of the melting shell 14 which is in contact with the metal being melted. The cross-sectional area of the flues may be varied for using different types of gas in order to control the application of the heat. With a short flame gas it is preferred to enter the gas at the bottom of the melting chamber and discharge it from the flues at the upper portion of the chamber in order to apply the highest temperature to the portion of the melting chamber with which the metal is in contact.

To enable the metal to be melted under pressure in the melting chamber 14 so that a loss by volatilization may be avoided, the shell 14 is constructed of carborundum or a similar condensed refractory which is substantially impervious to gas. To overcome the tendency of the gas to pass through the refractory shell 14 as it becomes more pervious to gas by being heated, the gas is burned in the flues 65, 66, 67 and 68 under pressure. To this end a damper 72 is placed in the spiral duct 61 for the entrance of air, and a damper 73 is placed in the duct 63 for the exhaustion of products of combustion. By using these dampers in connection with the pressure fan 49 and the suction fan 50, the pressure in the flues may be built up to substantially equal the pressure within the melting chamber 14 or any desired pressure, and this pressure may be uniformly maintained. With the fans 49 and 50, also, the combustion of the gas may be efficiently carried out in the combustion flues with a balanced draft which will also negative the tendency of volatile metal vapors to pass through the walls of the melting chamber. Further, the velocity of the circulation of the gases through the flues may be accurately controlled to govern the combustion and regulate the temperatures.

The use of the recuperator in conjunction with the furnace provides for an economical use of fuel and is particularly adapted for burning gas or a vaporized hydrocarbon. The recuperator is self-regulating in that the heat is exchanged from the hot products to the cold products and the thermal capacity and volumes of the cold and hot products are substantially equal. When burning a gas having a high heat value, it is not necessary to preheat the gas before introducing it into the combustion flues because the percentage of gas used in proportion to the amount of air is comparatively small. With gases having a lower heat value, which require a comparatively high proportion of air for burning them, it may be desirable to preheat both the gas and the air. To accomplish this, the flue 38 for admitting the air may be subdivided in the ratio of the amounts of air and gas to separately preheat the air and gas as they pass to the combustion flues.

The heating efficiency with gas or a vaporized fuel may be greatly increased when the products for combustion are preheated before they enter the combustion flues, since the amount of preheat is added directly to the flame temperatures and in this manner practically any flame temperature may be employed. When melting a metal with a predetermined fusing point, the higher the flame temperature the more rapid and efficient is the melting operation. By controlling the velocity of circulation of the products for combustion in the recuperator and the size and length of the recuperator flues, the amount of preheat to be given to the products for combustion can be carefully controlled and thus the flame temperature may be regulated. By this means the flame temperature can be raised when using practically the same amount of gas and the metal will be more effectively and efficiently melted.

Further, the recuperator and its operating mechanism are integrally attached to the furnace proper and may participate in any movement the furnace is given without interfering with the operation of the furnace or the recuperator. The furnace is very compact and is not subject to heavy wear, although it has a capacity for handling a large amount of metal due to the accurate control of the combustion and the flame temperatures.

The preferred form of the invention having been thus described, what is claimed is:

1. A metallurgical furnace having in combination a furnace body rotatably mounted for pouring, a closed melting chamber formed in said body, a series of combustion flues in said body, surrounding said melting chamber, and means for introducing and igniting gas and air only in the flues in the upper portion of said chamber, and withdrawing the products of combustion through a heat interchanger.

2. A metallurgical furnace having in combination, a furnace body rotatably mounted for pouring, a closed melting chamber formed in said body, comprising a hollow shell, a series of combustion flues formed in the external surface of said shell, means for introducing and igniting air and gas only in the flues formed in the upper portion of said chamber, means for controlling the combustion of gas with air in said flues, and means for imparting the heat of burned gaseous products directly to products for combustion entering said flues.

3. A metallurgical furnace having in combination a furnace body rotatably mounted for pouring and having an internal thin walled melting chamber, continuous external flues in said furnace body, comprising oppositely located inlet and outlet portions extending in the direction of the axis of rotation of said furnace body, connecting portions at one end of said chamber connecting the adjacent ends of said outlet and inlet portions, the other end of said chamber being formed with connecting flues into which the outlet ends of all said outlet portions open, and means fixed in and rotatable with said inlet portions for burning gas in said flues.

4. A metallurgical furnace having in combination, a furnace body, a melting chamber formed in said body comprising a shell, means for closing said chamber pressure-tight, combustion flues in said body formed in the external surface of said shell, and a balanced draft mechanism for burning gas under pressure in said flues, independently of the volume of combustible gases introduced into said flues.

5. A metallurgical furnace having in combination, a furnace body, a melting chamber formed in said body comprising a refractory shell, means for closing said chamber pressure-tight, a series of combustion flues formed in said body on the external surface of said shell, inlet flues in said body arranged to conduct combustible gas to said combustion flues, outlet flues in said body arranged to conduct exhaust gases from said combustion flues, out of said furnace, means for burning gas in said flues, and means for controlling the gas pressure in said inlet and outlet flues.

6. A metallurgical furnace having in combination, a furnace body, a melting chamber formed in said body comprising a shell formed of refractory material, combustion flues formed in said body in the external surface of said shell, a gas impervious casing surrounding said flues, inlet flues in said body arranged to conduct combustible gas to said combustion flues, outlet flues in said body arranged to conduct exhaust gases from said combustion flues out of said furnace, means for burning gas in said combustion flues, and means mounted in said inlet and outlet flues for controlling the gas pressure throughout the flues.

7. A metallurgical furnace having in combination, a furnace body built up of refractory plastic materials, a melting chamber in said body comprising a shell formed of carborundum, a series of combustion flues formed on the outer surface of said carborundum shell, a tight metallic casing for said furnace body, a heat recuperator connected to said furnace body, a flue for products of combustion in said recuperator, a flue for products for combustion in said recuperator, connections between said recuperator flues and said combustion flues, fans for controlling the circulation of combustion gases in said recuperator and combustion flues, and means for closing said melting chamber pressure-tight.

8. A metallurgical furnace having in combination, a furnace body, a melting chamber in said body, means for closing said chamber to exclude products of combustion therefrom, a series of combustion flues in said body surrounding said chamber, means for introducing gases into the portion of said combustion flues adjacent the upper portion of said melting chamber, and means for controlling the burning of gas in said flues to develop the highest temperature in said flues at the portion of the melting chamber directly in contact with metals to be melted.

9. A metallurgical furnace having in combination, a furnace body being rotatably mounted for pouring and having an internal melting chamber, closed combustion flues and a recuperator connected to said body, said recuperator having alternating air and gas flues coiled spirally within its interior directly around one another and leading to and from said combustion flues, whereby air passing through said air flues on its way to said combustion flues will absorb the heat of the gas coming from said combustion flues.

10. A metallurgical furnace having in combination, a furnace body having an internal melting chamber and closed combustion flues, a recuperator connected to said body and provided with separate internal air and gas flues leading to and from said combustion flues, a fan having a casing communicating with air flues for forcing air therethrough to said combustion flues, and a separate fan communicating with the gas flues for exhausting gas from said combustion flues.

11. A metallurgical furnace having in combination, a furnace body, a melting chamber in said body adapted to be closed, combustion flues in said body surrounding said chamber, a heat-transferring recuperator having separate flues leading to and from said combustion flues, a fan for controlling each of the flues of the recuperator, and a damper in each of said recuperator flues for controlling the gas pressure in the combustion flues.

12. A metallurgical furnace having in combination, a furnace body, a melting chamber formed in said body, combustion flues in said body surrounding said melting chamber, a recuperator mounted on said furnace arranged to preheat products for combustion with combustion products, fans connected with said recuperator for controlling the circulation of gases within said combustion flues, a door for tightly closing said melting chamber, means for rotating said furnace, recuperator and fans to permit pouring from said melting chamber and to allow the melting chamber to be heated during said pouring operation.

13. A metallurgical furnace having in combination, a furnace body, an internal melting chamber, a series of combustion flues in said body formed around the upper portion of said chamber, a conduit connected with the air entrance end of each of said flues, a heat recuperator connected to said body, said recuperator having separate internal air and gas flues leading to said conduit and connected with the exhaust end of said combustion flues, means for controlling the circulation of products for combustion in said flues, and means for delivering combustion gas to said conduit to mix gas with said air at the entrance of each of said combustion flues.

In testimony whereof we affix our signatures.

JOHN WILLIAM GRISWOLD.
HENRY O. LOEBELL.